(12) United States Patent
O'Neill

(10) Patent No.: US 10,262,304 B2
(45) Date of Patent: Apr. 16, 2019

(54) SCANNING RECOGNITION DECISIONS

(71) Applicant: NCR Corporation, Duluth, GA (US)

(72) Inventor: Darryl Scott O'Neill, Waterloo (CA)

(73) Assignee: NCR Corporation, Atlanta, GA (US)

( * ) Notice: Subject to any disclaimer, the term of this patent is extended or adjusted under 35 U.S.C. 154(b) by 8 days.

(21) Appl. No.: 15/472,316

(22) Filed: Mar. 29, 2017

(65) Prior Publication Data

US 2018/0285835 A1 Oct. 4, 2018

(51) Int. Cl.
*G06Q 20/04* (2012.01)
*G06Q 20/18* (2012.01)
*G06Q 20/40* (2012.01)
*G06K 9/00* (2006.01)
*G06K 9/20* (2006.01)
*H04N 1/00* (2006.01)

(52) U.S. Cl.
CPC ....... *G06Q 20/042* (2013.01); *G06K 9/00469* (2013.01); *G06K 9/2054* (2013.01); *G06Q 20/18* (2013.01); *G06Q 20/4016* (2013.01); *H04N 1/00225* (2013.01); *G06K 2209/01* (2013.01)

(58) Field of Classification Search
CPC ............... H04N 1/00; G06K 9/00; A61B 5/00
USPC .......................................... 382/138
See application file for complete search history.

(56) References Cited

U.S. PATENT DOCUMENTS 5,151,948 A * 9/1992 Lyke ...................... G06Q 40/02
235/379
8,007,354 B2 * 8/2011 Mindes .................. G06Q 10/00
463/16

* cited by examiner

*Primary Examiner* — Abolfazl Tabatabai
(74) *Attorney, Agent, or Firm* — Schwegman, Lundberg & Woessner

(57) ABSTRACT

Images of scanned documents are processed to identify an amount for each document. At least one document has two possible amounts with each amount having a different confidence level associated therewith. A provided total amount is balanced to a determined total amount by resolving a permutation of the available amounts from the images that matches the provided total amount.

20 Claims, 4 Drawing Sheets

SCANNING RECOGNITION DECISIONS

BACKGROUND

Electronically processing image data often encounters a variety of problems during Optical Character Recognition (OCR). Many times the OCR engine can identify a set of pixels as a particular character or digit with some level of confidence by without complete confidence.

For decent sized scan jobs of several documents, a single error in an accurate recognition can create a sizable manual task in locating the problem document where the recognition was inaccurate.

SUMMARY

In various embodiments, methods and a terminal are presented for scanning recognition decision processing.

According to an embodiment, a method for scanning recognition decision processing is presented. Specifically, and in an embodiment, a balance total is obtained for a plurality of documents. Images are received with each image representing a particular document. At least one amount is identified for each image and at least one image includes two or more selectable amounts. Finally, a permutation of the amounts for the images is resolved that represents a total amount and that equals the balance total.

DETAILED DESCRIPTION

Figure 1:
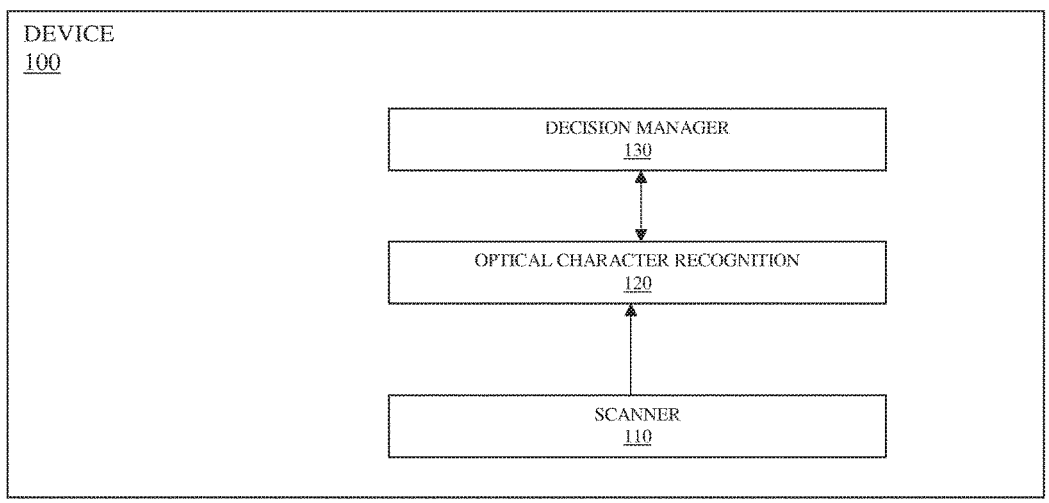
FIG. 1 is a diagram of a terminal that performs scan recognition decision processing, according to an example embodiment.

FIG. 1 is a diagram of a terminal/device 100 that performs scan recognition decision processing, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of scan recognition decision processing presented herein.

The terminal 100 (hereinafter referred to as "device 100") includes: 1) a decision manager set of software instructions 130 (referred to hereinafter as "decision manager 130"), 2) an OCR software module 120 (referred to hereinafter as "OCR 120"); and 3) a scanner 110. The device also includes: one or more hardware processors, memory, and storage. During boot of the device 100 an Operating System (OS) is loaded into memory for execution by the one or more hardware processors. The OS loads executable instructions for processing the decision manager 130, the OCR 120, and a scanner driver for interaction with the scanner 110.

A plurality of documents comprise a scan job or scan transaction that are scanned by the scanner 110 to create document images (electronic digital images) of the physical documents. The document images are passed to the OCR engine 120 where components of the pixels within each document image are recognized as characters and/or digits, which can be manipulated as electronic data by other software processing on the device 100.

One scan job that is of particular import in accounting at businesses or financial institutions is a deposit balancing operation in which a plurality of checks (type of document) are deposited and the amounts of the checks are identified as numbers (sequence of digits) following operating by the OCR engine 120 and totaled represent a total sum of a deposit. An initial amount is entered into an interface of the device 100 as the believed total for the sum of the individual check deposit amounts. While the individual checks are being processed from electronic images into the sequence of digits a running total is maintained by the decision manager 130 along with a variety other information about each deposited check. At the conclusion of the deposit transaction, the initial inputted sum provided by a clerk or a customer should match what the calculated sum is, as determined by the decision manager 130.

Typically, a check includes two components in its electronic image representing a currency amount for the check that is being deposited, a printed currency amount (referred to as the "courtesy amount" representing the digit amount) and a handwritten amount (referred to as the "legal" amount and representing the spelled out character words for the amount).

During operation, a user (clerk or depositor) accesses a user-facing interface of the device 100 to indicates a total for processing of checks that are being deposited (this is known to the user and previously calculated before the user access the user-facing interface).

As an example, consider a user depositing 3 checks (physical documents) for a total of $100 at the device 100. The user accesses the user-facing interface to indicate that the user is depositing a total of $100. Next, the checks are placed into an auto feed compartment of the scanner 110 or manually feeds each check into the scanner 110.

The scanner 110 takes a digital image of the check (can be both front and back (to capture an endorsement signature)). The images are fed to the OCR engine 120 and confidence values are assigned to the identified amounts of each check determined by the OCR engine 120. For example, the OCR engine 120 may assign a 75% confidence that the first check is $55 and also assign a 70% chance that the first check is $50. These confidence values are compared against a threshold value that is set for resolving the amount, such that when the threshold value is exceeded by a confidence value then the recognized amount with the confidence value that exceeded the threshold value is used when summing the checks in the balancing operation for the check deposits.

For the example scenario consider 3 checks are processed with the following confidence values associated by the OCR engine 120:

1. first check=75% that it is $55, and 70% that it is $50;
2. second check=85% that is $30, and 60% that it is $80; and
3. third check=100% chance that it is $20;

The different confidence percentages and the dollar amounts for each of the three checks are provided to the decision manager 130. The decision manager 130 performs the balancing operation and uses the threshold value for making decisions as to which recognized dollar amount to accept from the OCR engine 120.

Using the threshold value of 70% (configurable parameter to the decision manager 130), the decision manager 130 quickly determines that the total for the deposit is $105 but the decision manager 130 also knows that the user inputted a total deposit for the three checks as being $100, which means that the balancing operation did not balance properly ($100 user entered at the start of the deposit transaction and $105 determined to be the deposit total by the decision manager 130).

The decision manager 130 maintains the different combinations available for each check and its recognized amount along with its confidence value. So, in the present example, checks 1 and 2, each have two possible combinations (first check has two combinations of: 1) 75% for $55 and 2) 70% for $50, the second check has two combinations of: 1) 85% for $30 and 2) 60% for $80). The third check only has one combination: 100% for $20. The permutations are utilization of a particular combination from 1 of the checks with another particular combination selected for the other two checks. Here, there are 4 total permutations because each permutation includes the $20 third check. The permutations can be calculated as the product of the available combinations multiplied together, so here this is 4 (2 (combinations for the first check) times 2 (combinations for the second check) times 1 (a single combination for the third check).

However, the decision manager 130 does not have to process all the combinations and permutations to arrive at the correct balance amount because the decision manager 130 knows that the balance operation is off by $5 ($105 calculated minus $100 entered by the user at the start of the deposit transaction) and the decision manager 130 knows that there is a combination for the first check (70% confidence in $50) having a $5 difference from another combination of the first check (75% confidence in $55). Therefore, the decision manager 130 quickly replaces the $55 recognized value for the first check with the $50 recognized value and the balancing function balances with the user ($100 entered at the start by the user and $100 resolved by the decision manager 130).

It is noted that the confidence values do not total 100% as seen in the previous example. Although, in some abnormal situations the confidence values for a single check can by chance total 100%. The confidence values are just a value assigned following OCR the check images, the value assigned according to a predefined scale (range) where the highest and lowest confidence values are predefined for the scale. Thus, in the examples, a percentage could include any value along the range 0-100% with 0 known to be the lowest and 100 known to be the highest.

It is also noted that multiple confidence values for multiple potential amounts from a single check image can be supplied from a single OCR engine or from multiple different OCR engines that execute in parallel against a single check image to provide the potential amounts and confidence values. In an embodiment, the confidence values are predefined for the OCR engine, such that each separate OCR engine returns a potential amount for a single check image and when the multiple returned amounts do not equal a same amount, the confidence values known for each OCR engine is assigned to the unequal amounts. In an embodiment, the known accuracy of the OCR engines is used to weight confidence values returned from each of the OCR engines.

It is noted that the example can be much more complex than what was illustrated. For example, there can be over 100 checks being processed.

The decision manager 130 keeps track of the combinations (confidence values and associated dollar amounts) for each of the checks being deposited. The total for the checks is provided as input to the decision manager 130 through a user-facing interface. The decision manager 130 is configured to organize the combinations in a data structure for quick access and maintains difference amounts for each combination relative to another combination, this allows for the decision manager 130 (in some embodiments) to avoid having to inspect each permutation from all the checks and rapidly find a correct permutation having a single combination selected for each deposited check. This improves the processing throughput and quality of the balancing operation and is particularly useful for check deposits that are being deposited.

In an embodiment, the decision manager 130 processes all the possible combinations from all the permutations and serially presents each possible combination as an option for the user to accept or reject by displaying the particular check image along with the amount that the decision manager 130 believes to be correct versus what was inputted as the value for that particular check. When the user rejects a potential change for a combination for a presented particular check, then the decision manager 130 presents the next possible combination that could potentially resolve the balancing error. This can be done serially. This can also be done based on a priority order with the most likely error presented first to the user. Moreover, the decision manager 130 can, in some cases, present combinations that would correct the error to the user while the user is being presented some combinations that would correct the error, such that if the user accepts a presented combination error, the decision manager 130 can stop processing to resolve all the possible combinations from all the available permutations. This is a significant improvement over prior techniques where the user is essentially forced to manually review each check image and inputted amount for the check associated with that check image.

It is noted that the balancing function does not have to be associated with a deposit operation; that is, the balancing function can be used to sum a total of checks deposited to balance out checks received by an organization, a clerk, or the terminal 100 at the end of a day or a shift.

Moreover, although the combination of the OCR engine 120 and the decision manager 130 are particularly useful for check documents, other documents can be used as well where OCR is being used to extract amounts and perform some calculation for purposes of balancing. For example, invoices may have been collected as physical documents and scanned for totaling and balancing a variety of elements, such as and by way of example only, ordered quantity, shipped quantity, inventory quantity, etc.

The combination of the OCR engine 120 and the decision manager 130 provide a mechanism through which scanned documents can have amounts identified with varying degrees of recognized confidence and balanced with what is expected to be present in the scanned documents.

In instances where the combinations and permutations of the combinations do not result in a correct balance operation, the decision manager 130 can send an image of one or more of the scanned documents to the user-facing interface to suggest that something is particularly askew with those documents and suggest manual correction by the user through the user-facing interface. Such that, the user does not have to manually re-tabulate and re-scan each of the documents. In such a scenario, the lowest check confidence value selected can be displayed to the user for correction and once made the decision manager 130 reprocessed the combinations and permutations to balance, such that the user may only have to manually inspect 1 to a few check images to achieve a successful balance.

A policy or set of policies can also be enforced by the decision manager 130 to avoid high dollar amount selections being done in an automated fashion, for example suppose the difference between two combinations exceed $1000 for a single check and the correct combination selected the higher value amount. Here, the check in question may require manual verification to ensure that a large value selection is not automatically used by the decision manager 130.

It is recognized by one of ordinary skill in the art that the combination of the OCR engine 120 and the decision manager 130 provide substantial processing throughput in performing balancing operations. Conventionally, when a conventional balancing function is processed, the user has to review some items for it to continue or has to rescan the documents. However, with the teachings presented herein, the processing throughput of the balancing operation is improved and the accuracy of the balancing function is improved while manual effort is substantially eliminated.

In an embodiment, the device 100 is a Self-Service Terminal (SST). In an embodiment, the SST is an Automated Teller Machine (ATM). In an embodiment, the SST is a kiosk.

In an embodiment, the device 100 is a tablet computer.

In an embodiment, the device 100 is a Point-Of-Sale (POS) terminal operated by a clerk.

In an embodiment, the device 100 is a desktop computer.

In an embodiment, the device 100 is a server computer with a remote network connected interface to the scanner 110.

In an embodiment, the device 100 is part of a cloud processing environment with a remote network connected interface to the scanner 110.

These and other embodiments are now discussed with reference to the FIGS. 2-4.

Figure 2:
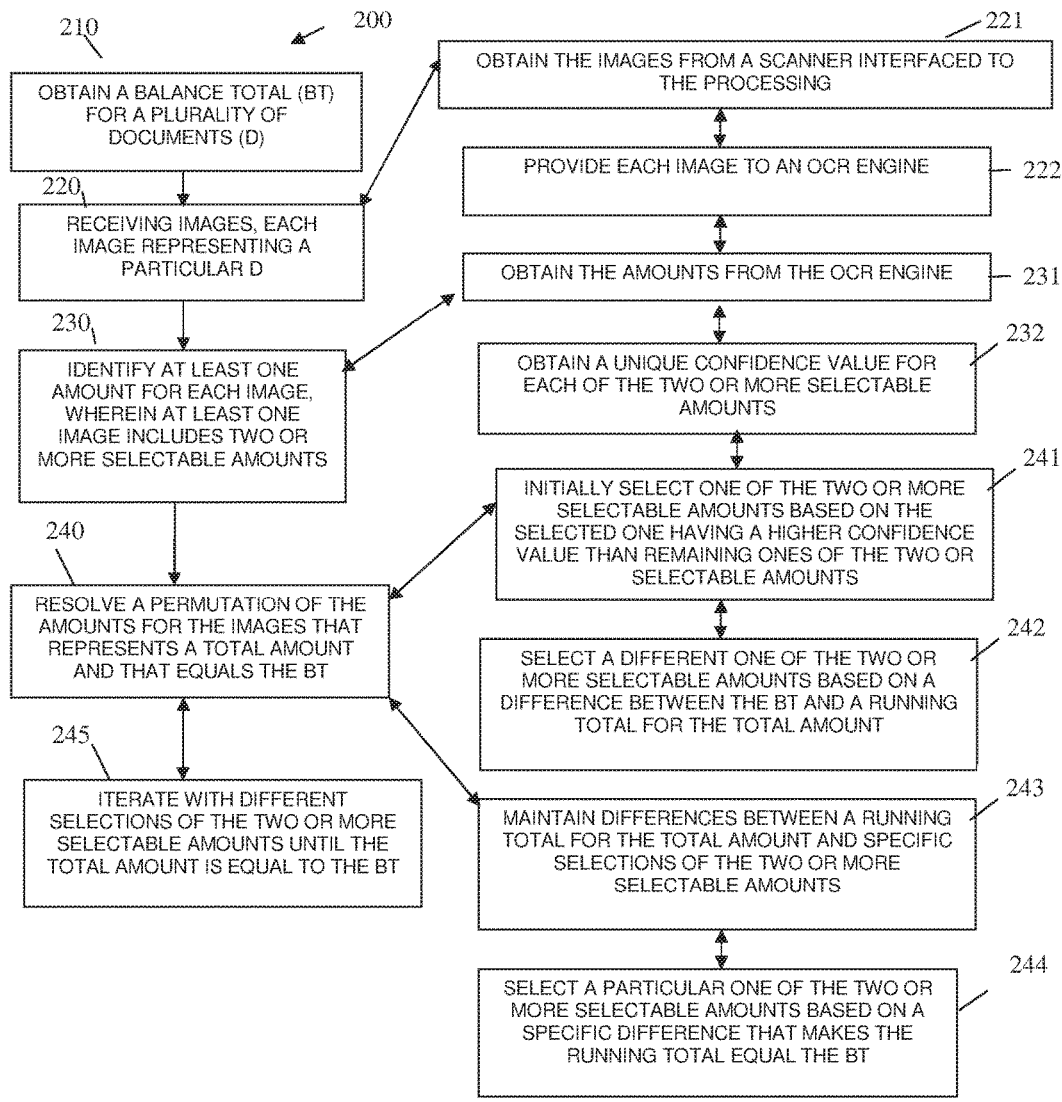
FIG. 2 is a diagram of a method for scanning recognition decision processing, according to an example embodiment.

FIG. 2 is a diagram of a method 200 for scanning recognition decision processing, according to an example embodiment. The software module(s) that implements the method 200 is referred to as a "balance manager." The balance manager is implemented as executable instructions programmed and residing within memory and/or a non-transitory computer-readable (processor-readable) storage medium and executed by one or more processors of a device. The processor(s) of the device that executes the balance manager are specifically configured and programmed to process the balance manager. The balance manager has access to one or more network connections during its processing. The network connections can be wired, wireless, or a combination of wired and wireless.

Figure 3:
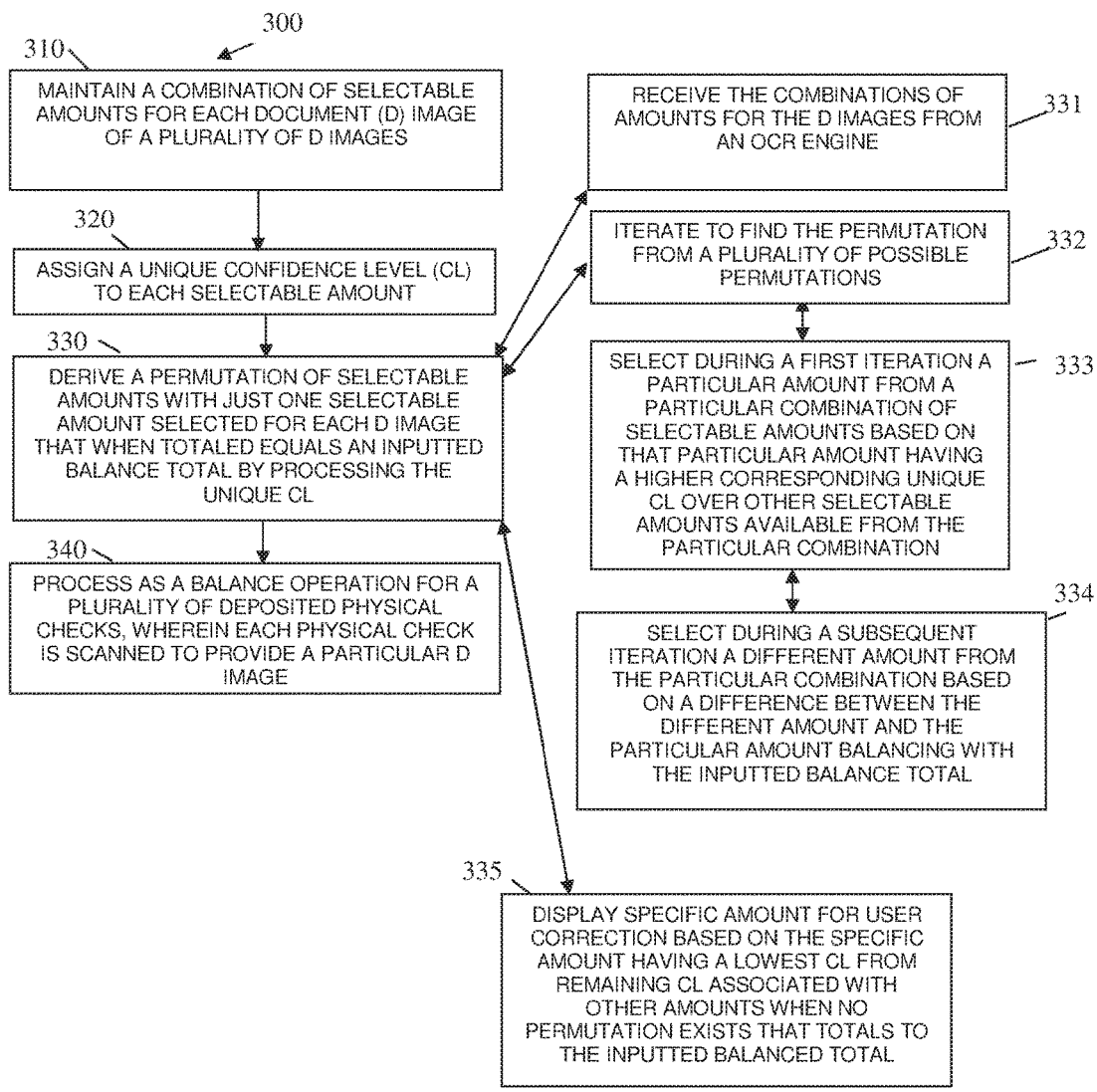
FIG. 3 is a diagram of another method for scanning recognition decision processing, according to an example embodiment.

FIG. 3 presents another and in some cases, perhaps, an enhanced processing perspective from that which was discussed with the FIG. 2.

In an embodiment, the device that executes the balance manager is the device 110.

In an embodiment, the device that executes the balance manager is a SST. In an embodiment, the SST is an ATM. In an embodiment, the SST is a kiosk.

In an embodiment, the device that executes the balance manager is one of: a tablet computer, a mobile phone, a laptop computer, and a desktop computer.

In an embodiment, the device that executes the balance manager is a server.

In an embodiment, the device that executes the balance manager is a cloud processing environment for which the device is a part of.

In an embodiment, the balance manager is the decision manager 130.

In an embodiment, the balance manager is all or some combination of the decision manager 130 and/or the OCR engine 120.

At 210, the balance manager obtains a balance total for a plurality of documents. In an embodiment, the balance total is provided through a user-facing interface to the balance manager as part of a check deposit transaction on the device that operates the balance manager; the documents are physical checks being deposited in batch.

At 220, the balance manager receives images for the documents where each image represents a particular document.

In an embodiment at 221, the balance manager obtains the images from a scanner interfaced to the device that executes the balance manager and therefore interfaced to the balance manager.

According to an embodiment of 221 and at 222, the balance manager provides each image to an OCR engine for recognition of component pixilated portions of the images.

In an embodiment, some OCR results for a single one of the plurality of images includes identification of a single amount having an assigned confidence value based on a predefined scale that can be percentage based or based on some predefined numeric range (for example 1-10 with 10 being the highest confidence.

The OCR results produce, for at least one image, identification of two or more different amounts, each amount having an assigned confidence value based on some predefined range (percentage 1-100 or 1-10, etc. with the highest confidence value and lowest confidence value being known for the predefined range).

At 230, the balance manager identifies at least one amount present in each of the images. At least one of the images includes two or more selectable amounts. That is, the OCR engine is not completely confident that a particular document has a set amount recognized and as a result at least two alternative amounts are provide for that document image.

In an embodiment of 222 and 230, at 231, the balance manager obtains the amounts from the OCR engine including the two or more alternative selectable amounts.

In an embodiment of 231, and at 232, the balance manager obtains a unique confidence value for each of the two or more selectable amounts. That is, for the at least one image where multiple amounts were recognized with a varying degree of confidence, the balance manager obtains from the OCR engine a confidence value that is unique to each of the two or more selectable amounts.

At 240, the balance manager resolves a permutation of amounts for the images that represents a total amount and that equals the balance total. The permutation is a selection of just one selectable amount and a selection of a single amount for each document image.

In an embodiment of 232 and 240, at 241, the balance manager initially selects one of the two or more selectable amounts for the permutation based on the selected amount having a higher confidence value that remaining ones of the two or more selectable amounts.

In an embodiment of 241 and at 242, the balance manager selects a different one of the two or more selectable amounts based on a difference between the balance total and a running total for the total amount for the permutation. That is, if the selection with the higher confidence value at 241 did not produce a balanced total and if a difference between the two or more selectable amounts would produce a balance total by selecting the different selectable amount, then the balance manager selects the different selectable amount for the permutation to balance with the balance total.

In an embodiment, at 243, the balance manager maintains differences between a running total for the total amount and specific selections of the two or more selectable amounts. This difference permits the balance manager to rapidly determine an amount from a combination of selectable amounts that would produce a balance total.

Accordingly, in an embodiment of 243 and at 244, the balance manager selects a particular one of the two or more selectable amounts based on a specific difference that makes the running total equal the balance total.

In an embodiment, at 245, the balance manager iterates the processing at 240 with different selections of the two or more selectable amounts until the total amount is equal to the balance total.

In an embodiment, the balance manager resolves more than one combination of selectable amounts from the running total that equals the balance total and causes each of the combinations to be presented to a user for correcting a particular combination that makes the total amount equal the balance total that was inputted.

In an embodiment, the balance manager resolves all possible combinations from all permutations that would produce a total amount in the documents that matches the inputted balance total. The balance manager then allows many inspection of the images associated with each of the possible combinations to be inspected and a selection made of a particular one of the possible combinations that produces the total amount equal to the inputted balance total.

FIG. 3 is a diagram of another method 300 for scanning recognition decision processing, according to an example embodiment. The software module(s) that implements the method 300 is referred to as a "balancer." The balancer is implemented as executable instructions programmed and residing within memory and/or a non-transitory computer-readable (processor-readable) storage medium and executed by one or more processors of a device. The processors that execute the balancer are specifically configured and programmed to process the balancer. The balancer has access to one or more network connections during its processing. The network connections can be wired, wireless, or a combination of wired and wireless.

In an embodiment, the device that executes the balance manager is the device 110.

In an embodiment, the device that executes the balancer is a SST. In an embodiment, the SST is an ATM. In an embodiment, the SST is a kiosk.

In an embodiment, the device that executes the balancer is one of: a tablet computer, a mobile phone, a laptop computer, and a desktop computer.

In an embodiment, the device that executes the balancer is a server.

In an embodiment, the device that executes the balancer is a cloud processing environment for which the device is a part of.

In an embodiment, the balancer is the decision manager 130.

In an embodiment, the balancer is all or some combination of the decision manager 130, the OCR engine 120, and/or the method 200 of the FIG. 2.

At 310, the balancer maintains a combination of selectable amounts for each document image of a plurality of document images. That is, each document is associated with a single amount but has two or more potential recognized amounts.

At 320, the balancer assigns a unique confidence level (value) to each selectable amount within a combination. A single combination can have two selectable amounts or three or more selectable amounts. The assigned confidence levels for all the selectable amounts within a single does not total to 100% although in some strange situation this could possibly be the case; rather, the confidence levels are a metric/percentage that the value identified in a particular document image is a certain amount.

At 330, the balancer derives a permutation of selectable amounts with just one selectable amount selected for each document image, such that when the amounts for all the document images are totaled, the totaled amount is equal to an inputted balance total. This is done by, at least partially and initially processing the confidence values when selecting specific amounts from a combination of selectable amounts.

In an embodiment, at 331, the balancer receives the combinations of amounts for the document images from an OCR engine. In an embodiment, the OCR engine is the OCR engine 120.

In an embodiment, at 332, the balancer iterates the processing at 330 to find the permutation from a plurality of possible permutations.

In an embodiment of 332 and at 333, the balancer selects during a first iteration a particular amount from a particular combination of selectable amounts based on that particular amount having a higher corresponding assigned unique confidence level over other selectable amounts available from the particular combination. In other words, a first iteration attempts to balance the total of amounts from the document image by selection from each combination the amount having the highest confidence value.

In an embodiment of 333 and at 334, the balancer selects during a subsequent iteration a different amount from the particular combination based on a difference between the different amount and the particular amount balancing with the inputted balance total. So, the difference between selectable amounts within a combination are maintained by the balancer and if the running total is off by a particular different then the amount that was previously not selected for the permutation is selected to balance with the inputted balance total.

In an embodiment, at 335, the balancer displays a specific amount for user correction with a specific document image (the amount displayed within the document image context) based on the specific amount having a lowest confidence level from remaining confidence levels associated with other amounts when no permutation exits that totals to the inputted balance total. Here, if the permutation is not found then the amount that had the lowest confidence total selected is displayed within the context of its document image for the user to inspect and change for purposes of attempting to resolve and balance with the inputted balance total.

According to an embodiment, the balancer is processes as a balancing operation for a plurality of deposited physical checks. Each physical check is scanned to provide a particular document image.

In an embodiment, the balancer processes to determine all possible combinations from all permutations that would result in a correct balance. Each of these possible combinations along with their associated images are presented to a user along with the believed value is calculated to potentially be for the images. As soon as the user selects a calculated value for one of the possible combinations, the balancing operation completes. In an embodiment, the balancer continues to determine all possible combinations as some already resolved combinations are presented to the user for acceptance, correction, or rejection; such that as soon as a user makes a change or accepts a value that produced a balance situation, the balancer can disregard processing to determine remaining undetermined possible combinations.

Figure 4:
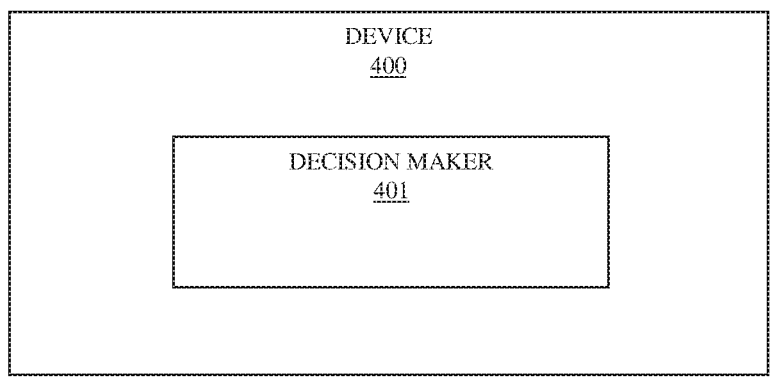
FIG. 4 is a diagram of a terminal for scan recognition decision processing, according to an example embodiment.

FIG. 4 is a diagram of a terminal 400, according to an example embodiment. The terminal 400 includes a variety of hardware components and software components. The software components of the terminal 400 are programmed and reside within memory and/or a non-transitory computer-readable medium and execute on one or more processors of the terminal 400. The terminal 400 may communicate over one or more networks, which can be wired, wireless, or a combination of wired and wireless.

In an embodiment, the terminal 400 is the device 100 of the FIG. 1.

In an embodiment, the terminal 400 is an SST. In an embodiment, the SST is an ATM. In an embodiment, the SST is a kiosk.

In an embodiment, the terminal 400 is a POS terminal operated by a clerk.

In an embodiment, the terminal 400 is one of: a tablet computer, a mobile phone, a wearable processing device, a laptop computer, and a desktop computer.

In an embodiment, the terminal 400 implements all or some combination of the processing discussed above with the FIGS. 1-3.

The terminal 400 includes an application OS 401 and a decision maker 401.

The decision maker 401 is configured to: 1) execute on one or more processors of the terminal 400, 2). maintain selectable amounts for each of a plurality of document images, and 3) select a permutation of the selectable amounts with just one selectable amount per document image where a total amount for the permutation balances with an inputted total for a total amount of the document images.

In an embodiment, the decision maker 401 is all or some combination of: the decision manager 130, the OCR engine 120, the method 200, and/or the method 300.

In an embodiment, the terminal 400 is one of: interfaced to a scanner over a network connection to receive the document images, and interfaced to an integrated scanner interfaced to the terminal 400 over an internal connection within the terminal 400 for receiving the document images.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
obtaining, by executable instructions that execute on a processor as a balance manager from a non-transitory computer-readable storage medium, a balance total for a plurality of documents;
receiving, by the balance manager, images, each image representing a particular document;
identifying, by the balance manager, at least one amount for each image, wherein at least one image includes two or more selectable amounts; and
resolving, by the balance manager, a permutation of the amounts for the images that represents a total amount and that equals the balance total by serially presenting each possible combination that equals the balance total to a user in an interface for selection of one of the possible combinations as the permutation.

2. The method of claim 1, wherein receiving further includes obtaining the images from a scanner interfaced to the method.

3. The method of claim 2, wherein receiving further includes providing each image to an Optical Character Recognition (OCR) engine.

4. The method of claim 3, wherein identifying further includes obtaining the amounts from the OCR engine.

5. The method of claim 4, wherein obtaining further includes obtaining a unique confidence value for each of the two or more selectable amounts.

6. The method of claim 5, wherein resolving further includes initially selecting one of the two or more selectable amounts based on the selected one having a higher confidence value than remaining ones of the two or selectable amounts.

7. The method of claim 6, wherein initially selecting further includes selecting a different one of the two or more selectable amounts based on a difference between the balance total and a running total for the total amount.

8. The method of claim 1, wherein resolving further includes maintaining differences between a running total for the total amount and specific selections of the two or more selectable amounts.

9. The method of claim 8 further comprising, selecting, by the balance manager, a particular one of the two or more selectable amounts based on a specific difference that makes the running total equal the balance total.

10. The method of claim 1, wherein resolving further includes iterating with different selections of the two or more selectable amounts until the total amount is equal to the balance total.

11. A method, comprising:
maintaining, by executable instructions that execute on a processor as a balancer from a non-transitory computer-readable storage medium, a combination of selectable amounts for each document image of a plurality of document images;

assigning, by the balancer, a unique confidence level to each selectable amount;

deriving, by the balancer, a permutation of selectable amounts with just one selectable amount selected for each document image that when totaled equals an inputted balance total by processing the unique confidence levels, wherein deriving further includes identifying possible combinations for the selectable amounts, each possible combination equaling the inputted balance total and presenting the possible combinations in an interface for selection by a user to derive the permutation.

12. The method of claim 11 further comprising processing the balancer as a balance operation for a plurality of deposited physical checks, wherein each physical check is scanned to provide a particular document image.

13. The method of claim 11, wherein maintaining further includes receiving the combinations of amounts for the document images from an OCR engine.

14. The method of claim 11, wherein deriving further includes iterating the deriving to find the possible permutations.

15. The method of claim 14, wherein iterating further includes selecting during a first iteration a particular amount from a particular combination of selectable amounts based on that particular amount having a higher corresponding unique confidence level over other selectable amounts available from the particular combination.

16. The method of claim 15, wherein selecting further includes selecting during a subsequent iteration a different amount from the particular combination based on a difference between the different amount and the particular amount balancing with the inputted balance total.

17. The method of claim 11, wherein deriving further includes displaying a specific amount within a context of a particular document image for user correction based on the specific amount having a lowest confidence level from remaining confidence levels associated with other amounts when no permutation exists that totals to the inputted balanced total.

18. A terminal, comprising:
a hardware processor configured to execute executable instructions representing a decision maker;
a non-transitory computer-readable storage medium having the executable instructions that are executed by the processor;
the decision maker;
wherein the decision maker is configured to: maintain selectable amounts for each of a plurality of document images, and select a permutation of the selectable amounts with just one selectable amount per document image where a total amount for the permutation balances with an inputted total for a total amount of the document images by identifying possible combinations for the selectable amounts that balances with the inputted total and presenting the possible combinations in an interface to a user for selecting one of the possible combinations as the permutation.

19. The SST of claim 18, wherein the terminal is one of: a Self-Service Terminal (SST), an Automated Teller Machine (ATM), a kiosk, a server, a cloud, a laptop, a mobile phone, a wearable processing device, a desktop, and a tablet.

20. The SST of claim 19, wherein the terminal is one of: interfaced over a network connection to a scanner to receive the document images and interfaced over an internal connection to an integrated scanner that is integrated into the terminal for receiving the document images.

* * * * *